(12) United States Patent
Nakagawa

(10) Patent No.: US 8,907,647 B2
(45) Date of Patent: Dec. 9, 2014

(54) TRANSFORMER CONTROL DEVICE

(75) Inventor: Tomoaki Nakagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 461 days.

(21) Appl. No.: 13/375,603

(22) PCT Filed: May 20, 2010

(86) PCT No.: PCT/JP2010/058569
§ 371 (c)(1),
(2), (4) Date: Dec. 1, 2011

(87) PCT Pub. No.: WO2010/143511
PCT Pub. Date: Dec. 16, 2010

(65) Prior Publication Data
US 2012/0069613 A1 Mar. 22, 2012

(30) Foreign Application Priority Data

Jun. 10, 2009 (JP) ................................ 2009-139240

(51) Int. Cl.
*H02M 3/156* (2006.01)
*H02M 7/5387* (2007.01)
*H02M 1/00* (2006.01)
*H02P 27/08* (2006.01)

(52) U.S. Cl.
CPC .. *H02M 7/53871* (2013.01); *H02M 2001/0035* (2013.01); *H02M 2001/007* (2013.01); *H02P 27/08* (2013.01); *H02P 2201/07* (2013.01); *Y02B 70/16* (2013.01)
USPC .............. 323/284; 323/222; 323/285; 363/97

(58) Field of Classification Search
USPC ........ 323/222, 282, 284, 285; 363/16, 65, 97, 363/124, 131
See application file for complete search history.

(56) References Cited

U.S. PATENT DOCUMENTS

2007/0216372 A1* 9/2007 Weng et al. .................... 323/222
2010/0321958 A1* 12/2010 Brinlee et al. ................ 363/21.1

(Continued)

FOREIGN PATENT DOCUMENTS

JP 2002-176771 A 6/2002
JP 2006-074932 A 3/2006

(Continued)

OTHER PUBLICATIONS

English machine translation of JP-2006074932-A. Original publication Mar. 16, 2006. Obtained from http://dossier1.ipdl.inpit.go.jp/AIPN/odse_top_dn.ipdl?N0000=7400 on May 12, 2014.*
German language Office Action, German Application No. 11 2010 002 433.2 dated Jun. 26, 2013.

*Primary Examiner* — Fred E Finch, III
(74) *Attorney, Agent, or Firm* — Squire Patton Boggs (US) LLP

(57) ABSTRACT

There is provided a control device which controls a transformer in accordance with a total loss imposed on a load driving system including the transformer and a load. In a control device of a transformer that boosts or drops an output voltage of a DC power supply and provides the output voltage to a load, the control device includes: a switching controller which performs switching control of the transformer; a load power deriving unit which derives load power; a transformer loss decrease amount deriving unit which derives a decrease amount of loss generated in the transformer, based on the load power derived by the load power deriving unit and a transformer ratio of the transformer, when the switching controller performs intermittent control of the transformer; a load loss increase amount deriving unit which derives an increase amount of loss generated in the load when the switching controller performs the intermittent control of the transformer; and a control command unit which instructs the switching controller to perform the intermittent control of the transformer when the decrease amount of transformer loss derived by the transformer loss decrease amount deriving unit is larger than the increase amount of load loss derived by the load loss increase amount deriving unit.

9 Claims, 18 Drawing Sheets

(56) References Cited

U.S. PATENT DOCUMENTS

2011/0084677 A1* 4/2011 Shi et al. .................. 323/284
2011/0267024 A1* 11/2011 Halberstadt ................ 323/304
2012/0049774 A1* 3/2012 Takamatsu et al. ........ 318/400.3

FOREIGN PATENT DOCUMENTS

| JP | 2006074932 A * | 3/2006 |
| JP | 2007-306773 A | 11/2007 |
| WO | WO 2004/114511 A2 | 5/2004 |

* cited by examiner

TRANSFORMER CONTROL DEVICE

TECHNICAL FIELD

The present invention relates to a control device which controls a transformer in accordance with total loss of a load driving system including the transformer and a load.

BACKGROUND ART

FIG. 12 is a schematic block diagram of a motor driving device disclosed in Patent Document 1. In the motor driving device shown in FIG. 12, a control device 30 receives a power-supply current Ib from a current sensor 11 and a reactor current IL from a current sensor 18. The control device 30 detects a maximum value ILmax and a minimum value ILmin based on the reactor current IL, and determines, based on the detected maximum value ILmax and minimum value ILmin and the power-supply current Ib, whether the reactor current IL crosses a zero point or not. When the reactor current IL crosses the zero point, the control device 30 generates a signal PWMS and outputs the generated signal PWMS to a boost converter 12. The boost converter 12 stops a boosting operation or a bucking operation based on a switching operation in accordance with the signal PWMS.

FIG. 13 is a circuit diagram showing a control system for DC/DC converter disclosed in Patent Document 2. In the control system shown in FIG. 13, when the voltage of a DC power supply 1 is converted into a constant-voltage DC output by ON/OFF operation of a switching element 2 and an oscillation period and a forced stop period are provided at a light load including no load to oscillate the switching element 2 intermittently, a signal outputted from an output voltage detecting and regulating circuit 6 for controlling an output voltage to be constant is used as a first command value for determining ON/OFF timing of the switching element 2 and a comparison signal for comparing the first command value with a constant-frequency triangular wave or saw-tooth wave signal is used as a control signal for controlling the oscillation period and forced stop period of the switching element 2 at the light load including no load. According to the control system, switching loss and conduction loss at a light load including no load on the DC/DC converter can be reduced.

PRIOR TECHNICAL DOCUMENTS

Patent Documents

Patent Document 1: WO 2004/114511
Patent Document 2: JP-A-2002-176771

SUMMARY OF THE INVENTION

Problem that the Invention is to Solve

In the aforementioned motor driving device according to Patent Document 1, the control device 30 controls the boost converter 12 to stop the switching operation when the reactor current IL crosses the zero point. When the switching operation of the boost converter 12 is stopped, switching loss can be reduced. However, when the switching operation of the boost converter 12 is stopped, the output voltage of the boost converter 12 drops toward the output voltage of the DC power supply 1 because of power consumed by the load. It is however undesirable that the switching operation of the boost converter 12 is stopped because the load gets out of optimum efficient running point when the output voltage of the boost converter 12 drops.

On the other hand, in the control system according to Patent Document 2, the switching element 2 is oscillated intermittently at a light load including no load. For this reason, the switching loss and conduction loss of the DC/DC converter at a light load including no load can be reduced. The intermittent oscillation control to repeat the forced stop period and the oscillation period alternately restrains the output voltage (transformed voltage) of the DC/DC converter from dropping. Accordingly, when the load is an electric motor, the output voltage of the DC/DC converter can be held so that the electric motor can operate at the optimum efficient running point. As shown in FIG. 14, the loss in the control system however increases because of increase of the reactor current at transition from the forced stop period to the oscillation period. Incidentally, the increase of the reactor current varies according to the boosting ratio of the DC/DC converter at transition from the forced stop period to the oscillation period.

As shown in FIG. 14, in the intermittent oscillation control in the control system, the output voltage of the DC/DC converter drops during the forced stop period. Incidentally, FIG. 15 is a circuit diagram showing a flow of current in a state where the output voltage of the DC/DC converter drops during the forced stop period. FIGS. 16(a) to 16(c) are graphs showing the relation between revolution speed and torque in the electric motor, and an orthogonal region and a field-weakening region of the electric motor in accordance with the magnitude of the input voltage. As shown in FIGS. 16(a) to 16(c), the orthogonal region and field-weakening region of the electric motor vary according to the input voltage. Accordingly, when the load is an electric motor, a running point in the orthogonal region may shift to the field-weakening region as shown in the dotted line arrow in FIGS. 16(a) and 16(b) while the output voltage of the DC/DC converter, that is, the input voltage of the electric motor drops during the forced stop period. As a result, a field-weakening current is generated in the electric motor to thereby increase ON loss and switching loss of an inverter provided as a part of the load between the DC/DC converter and the electric motor.

When the load is an electric motor at regenerating time, the output voltage of the DC/DC converter controlled to be intermittently oscillated increases during the forced stop period as shown in FIG. 17. Incidentally, FIG. 18 is a circuit diagram showing a flow of current in a state where the output voltage of the DC/DC converter increases during the forced stop period. Even when the output voltage of the DC/DC converter increases, the running point remains in the orthogonal region as represented by the one-dot chain line arrow in FIGS. 16(b) and 16(c) but the switching loss of the inverter increases.

When the DC/DC converter is controlled to be intermittently oscillated in this manner in the case where the electric motor provided as the load is a light load, the output voltage of the DC/DC converter pulsates as shown in FIGS. 14 and 17. As a result, the aforementioned loss in the load increases. In the control system disclosed in Patent Document 2, however, there is no consideration about the loss generated in the load because of intermittent oscillation control of the DC/DC converter.

An object of the invention is to provide a control device which controls a transformer in accordance with a total loss imposed on a load driving system including the transformer and a load.

Means for Solving the Problem

To solve the aforementioned problem and achieve the object, a transformer control device according to the invention described in claim 1 is a control device (e.g. a converter controller 100C in an embodiment) of a transformer (e.g. a boost converter 105 in the embodiment) that boosts or drops an output voltage of a DC power supply (e.g. a DC power supply 101 in the embodiment) and provides the output voltage to a load, comprising: a switching controller (e.g. a PWM controller 223 in the embodiment) which performs switching control of the transformer; a load power deriving unit (e.g. a load power calculator 203 in the embodiment) which derives load power; a transformer loss decrease amount deriving unit (e.g. a converter loss decrease amount deriving unit 207 in the embodiment) which derives a decrease amount of loss generated in the transformer based on the load power derived by the load power deriving unit and a transformer ratio of the transformer when the switching controller performs intermittent control of the transformer; a load loss increase amount deriving unit (e.g. a load loss increase amount deriving unit 209 in the embodiment) which derives an increase amount of loss generated in the load when the switching controller performs the intermittent control of the transformer; and a control command unit (e.g. a control stop determining unit 211 in the embodiment) which instructs the switching controller to perform intermittent control of the transformer when the decrease amount of transformer loss derived by the transformer loss decrease amount deriving unit is larger than the increase amount of load loss derived by the load loss increase amount deriving unit.

The transformer control device according to the invention described in claim 2 further comprises: a voltage fluctuation allowable amount deriving unit (e.g. a voltage fluctuation allowable amount deriving unit 205 in the embodiment) which derives a voltage fluctuation allowable amount of the transformer based on the load power derived by the load power deriving unit and the transformer ratio of the transformer when the switching controller performs intermittent control of the transformer; wherein: the load loss increase amount deriving unit derives an increase amount of loss generated in the load, when the output voltage of the transformer pulsates with a width of the voltage fluctuation allowable amount and the switching controller performs intermittent control of the transformer.

The transformer control device according to the invention described in claim 3 further comprises: a voltage detector (e.g. a voltage sensor 111 in the embodiment) which detects the output voltage of the transformer; wherein: the switching controller restarts switching control of the transformer when a change amount of the output voltage of the transformer detected by the voltage detector reaches the voltage fluctuation allowable amount, when switching control of the transformer is stopped at the time of the intermittent control of the transformer.

Moreover, in a transformer control device according to the invention described in claim 4, the switching controller stops switching control of the transformer when the output voltage reaches a command voltage for the transformer when switching control of the transformer is operated at the time of the intermittent control of the transformer.

The control device according to the invention described in claim 5 further comprises: a stoppable time deriving unit (e.g. a stoppable time deriving unit in the embodiment) which derives a stoppable time when switching control of the transformer can be stopped by the switching controller, in accordance with the load power derived by the load power deriving unit; wherein: the switching controller restarts switching control of the transformer when the stoppable time has passed after switching control of the transformer was stopped at the time of the intermittent control of the transformer.

A transformer control device according to the invention described in claim 6 is characterized in that: the control device increases a command voltage for the transformer in a range of the voltage fluctuation allowable amount while the switching controller performs switching control in intermittent control of the transformer in a state where the load consumes electric power.

A transformer control device according to the invention described in claim 7 is characterized in that: the control device decreases a command voltage for the transformer in a range of the voltage fluctuation allowable amount while the switching controller performs the intermittent control of the transformer in a state where the load outputs electric power.

Moreover, in a transformer control device according to the invention described in claim 8, the switching controller starts switching control of the transformer when a deviation between the output voltage and the corrected command voltage is not smaller than a deviation between the uncorrected command voltage and the corrected command voltage at the time of intermittent control of the transformer.

Moreover, in a transformer control device according to the invention described in claim 9, the switching controller stops switching control of the transformer when the output voltage reaches the corrected command voltage while switching control of the transformer is operated at the time of intermittent control of the transformer.

Effect of the Invention

According to a transformer control device of the invention described in claims 1 to 9, a switching controller controls a transformer intermittently when a decrease amount of transformer loss at intermittent control of the transformer is larger than an increase amount of load loss at pulsation of an output voltage of the transformer with a width of a voltage fluctuation allowable amount. Accordingly, the transformer can be controlled intermittently only in the case where the total loss imposed on the load driving system including the transformer and the load is reduced. That is, the transformer can be controlled in accordance with the total loss imposed on the load driving system including the transformer and the load.

MODE FOR CARRYING OUT THE INVENTION

An embodiment of the invention will be described below with reference to the drawings.

Figure 1:
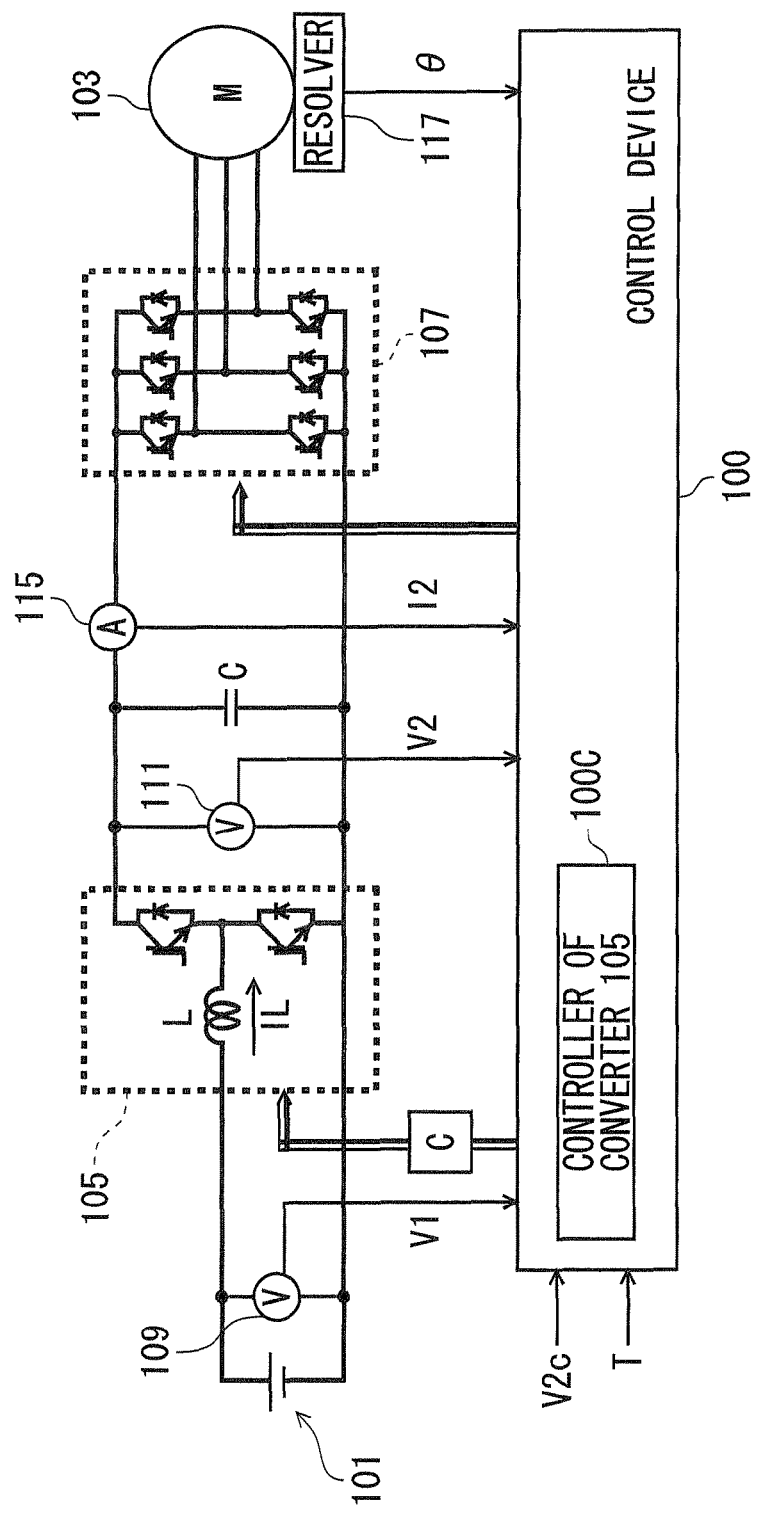
FIG. 1 is a diagram showing the configuration of a load driving system according to an embodiment.

FIG. 1 is a diagram showing the configuration of a load driving system according to one embodiment. In the load driving system shown in FIG. 1, a boost converter (hereinafter referred to as "converter" simply) 105 and an inverter 107 are provided between a DC power supply 101 such as a storage battery and an electric motor 103. The converter 105 boosts an output voltage V1 of the DC power supply 101. The inverter 107 converts an output voltage V2 of the converter 105 into a three-phase (U, V, W) alternating current. The electric motor 103 serves also as an electric generator. In this load driving system, the inverter 107 and the electric motor 103 are a load on the converter 105.

In the load driving system, a voltage sensor 109 for detecting the output voltage V1 of the DC power supply 101, a voltage sensor 111 for detecting the output voltage V2 of the converter 105, and a current sensor 115 for detecting a load current I2 in the case where the direction of outputting from the converter 105 and inputting to the inverter 107 is regarded as a positive direction are provided. A resolver 117 for detecting an electrical angle θ of a rotor of the electric motor 103 is also provided. Signals indicating values detected by the voltage sensors 109 and 111, the current sensor 115 and the resolver 117 are sent to a control device 100. A command voltage V2c and a torque command value T for the converter 105 are also inputted to the control device 100 from the outside.

The control device 100 controls the converter 105 and the inverter 107 respectively. As shown in FIG. 1, the control device 100 has a controller (hereinafter referred to as "converter controller") 100C of the converter 105. The converter controller 100C ordinarily or intermittently controls the converter 105.

Figure 2:
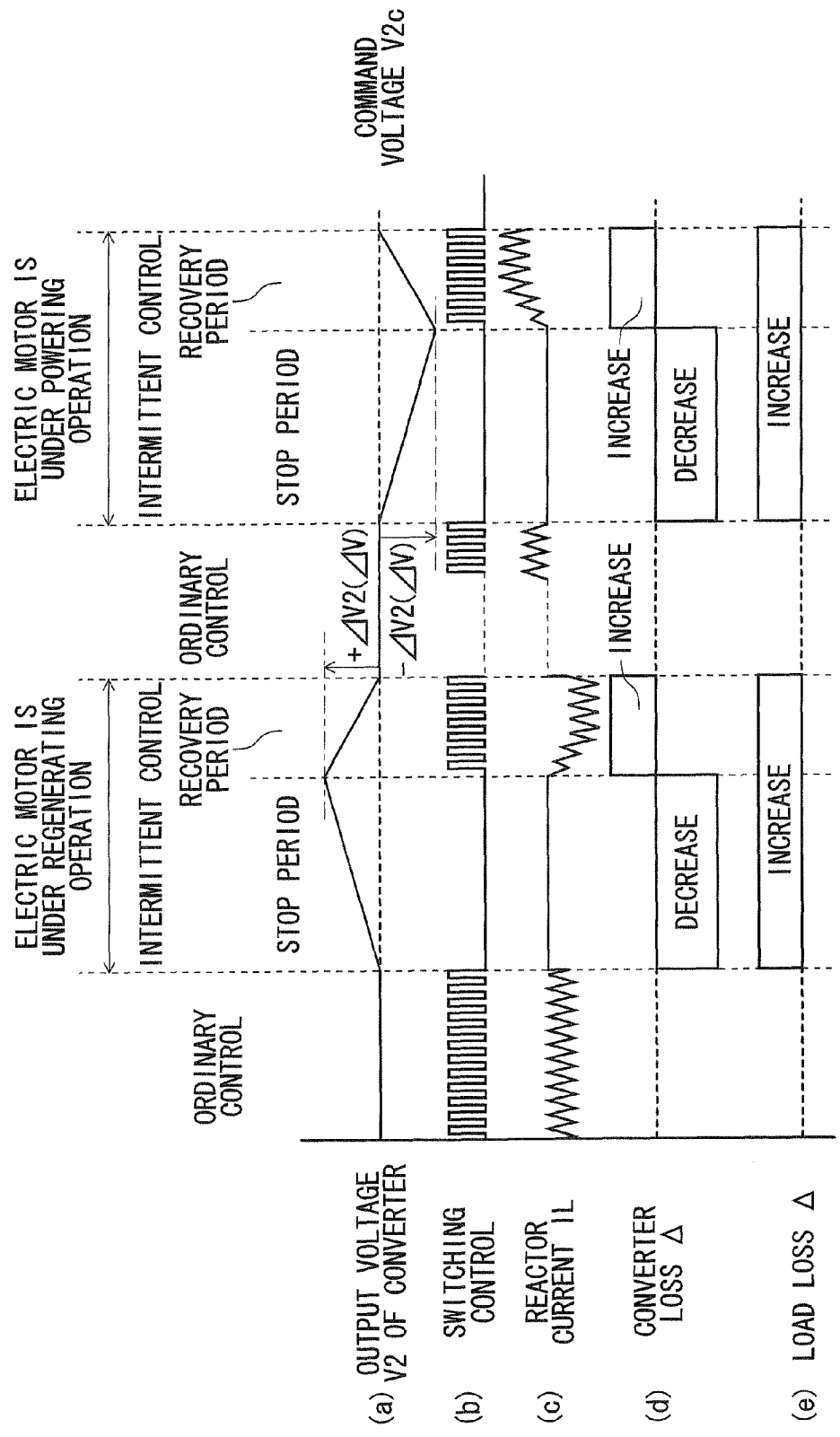
FIG. 2 is a graph showing (a) an output voltage V2 of a converter 105; (b) switching control of transistors forming the converter 105; (c) a reactor current IL flowing into a reactor L forming the converter 105; (d) decrease of a loss amount in the converter 105; and (e) decrease of a loss amount in a load when the converter 105 in the load driving system shown in FIG. 1 is controlled ordinarily or intermittently.

FIG. 2 is a graph showing (a) the output voltage V2 of the converter 105, (b) switching control of transistors forming the converter 105, (c) a reactor current IL flowing into a reactor L forming the converter 105, (d) decrease of a loss amount in the converter 105 and (e) decrease of a loss amount in the load when the converter 105 in the load driving system shown in FIG. 1 is controlled ordinarily or intermittently. As shown in FIG. 2(a), in this embodiment, a fluctuation width of the output voltage V2 of the converter 105 boosting or dropping during a stop period at the time of intermittent control of the converter 105 is represented by ΔV2. AS shown in FIG. 2(a), the converter controller 100C PWM-controls the converter 105 at the time of ordinary control of the converter 105 and during the recovery period at the time of intermittent control of the converter 105.

Figure 3:
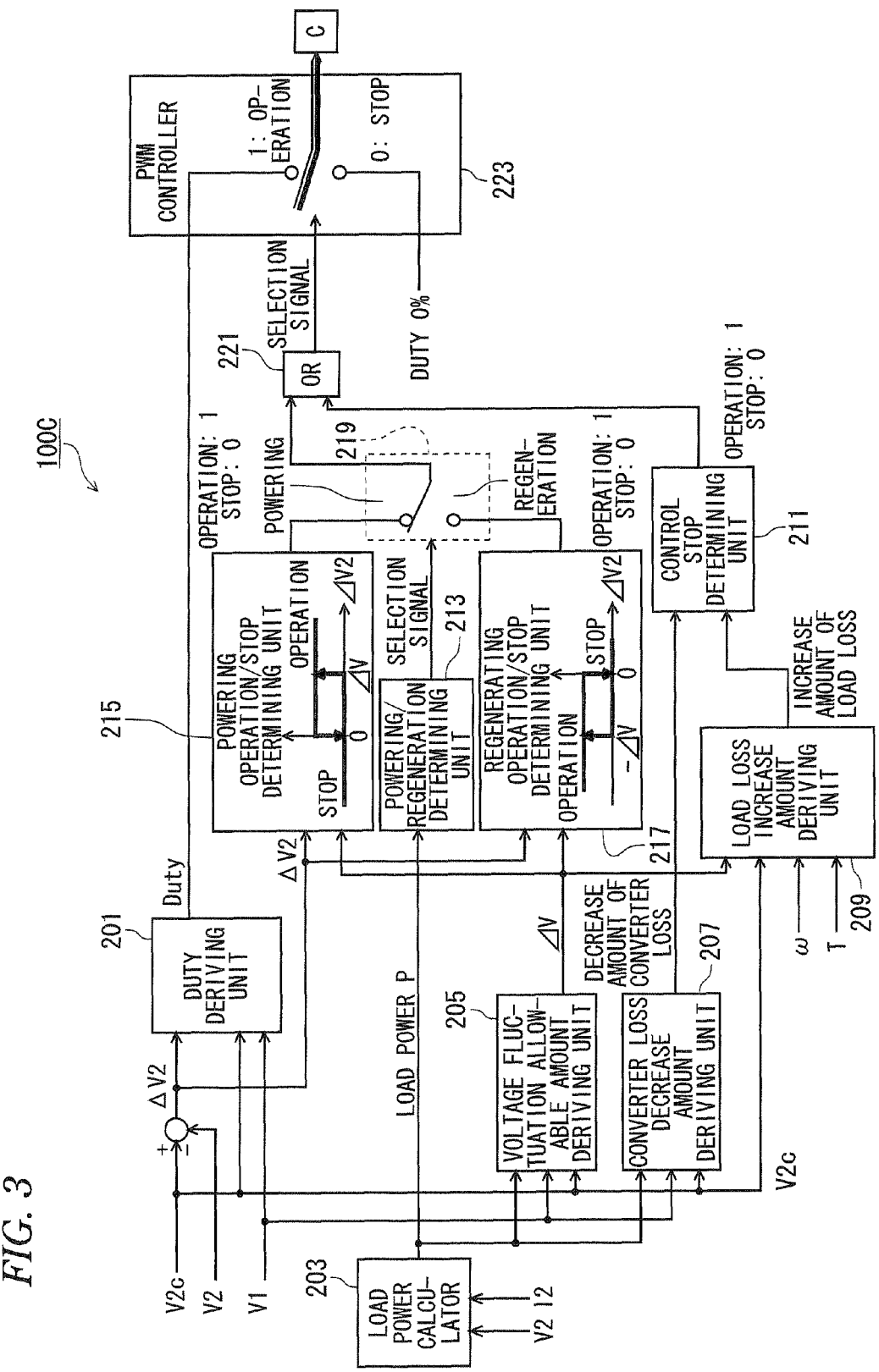
FIG. 3 is a block diagram showing the internal configuration of a converter controller 100C included in a control device 100.

FIG. 3 is a block diagram showing the internal configuration of the converter controller 100C included in the control device 100. As shown in FIG. 3, the converter controller 100C has a duty deriving unit 201, a load power calculator 203, a voltage fluctuation allowable amount deriving unit 205, a converter loss decrease amount deriving unit 207, a load loss increase amount deriving unit 209, a control stop determining unit 211, a powering/regeneration determining unit 213, a powering operation/stop determining unit 215, a regenerating operation/stop determining unit 217, a switch 219, an OR circuit 221, and a PWM controller 223.

Incidentally, a detected value of the output voltage V1 of the DC power supply 101, a detected value of the output voltage V2 of the converter 105, the command voltage V2c for the converter 105, a detected value of the load current I2, the torque command value T and a rotation angular velocity ω of the rotor of the electric motor 103 are inputted to the converter controller 100C. The rotation angular velocity ω is obtained by differentiating the detected value of the electrical angle θ of the rotor of the electric motor 103 detected by the resolver 117 with respect to time.

The command voltage V2c, the detected value of the output voltage V1 of the DC power supply 101 and a value indicating a deviation ΔV2 (=V2c−V2) between the command voltage V2c and the output voltage V2 are inputted to the duty deriving unit 201. The duty deriving unit 201 derives feed-forward duty (Duty_FF) necessary for the converter 105 to boost the output voltage V1 to a value designated by the command voltage V2c. The duty deriving unit 201 further derives feed-back duty (Duty_FB) to correct the feed-forward duty (Duty_FF) based on the derivation ΔV2, the output voltage V1 of the DC power supply 101 and the feed-forward duty (Duty_FF). The duty deriving unit 201 outputs a duty (Duty) obtained by correcting the feed-forward duty (Duty_FF) based on the feedback duty (Duty_FB). The duty (Duty) derived by the duty deriving unit 201 is inputted to the PWM controller 223.

A detected value of the output voltage V2 of the converter 105 and a detected value of the load current I2 are inputted to the load power calculator 203. The load power calculator 203 outputs, as load power P, a value obtained by multiplying the output voltage V2 of the converter 105 and the load current I2 together. The load power P is power (positive value) which is supplied to the inverter 107 by the converter 105, or power (negative value) into which power generated by the electric motor 103 is converted by the inverter 107 and which is supplied to the converter 105. Incidentally, the load power calculator 203 may output, as load power P, power which is obtained based on the torque command value T, the rotation angular velocity ω of the electric motor 103, the command voltage V2c and a measured map and which is supplied to the electric motor 103 or output power of the converter 105 in accordance with the power outputted from the electric motor 103.

Figure 4:
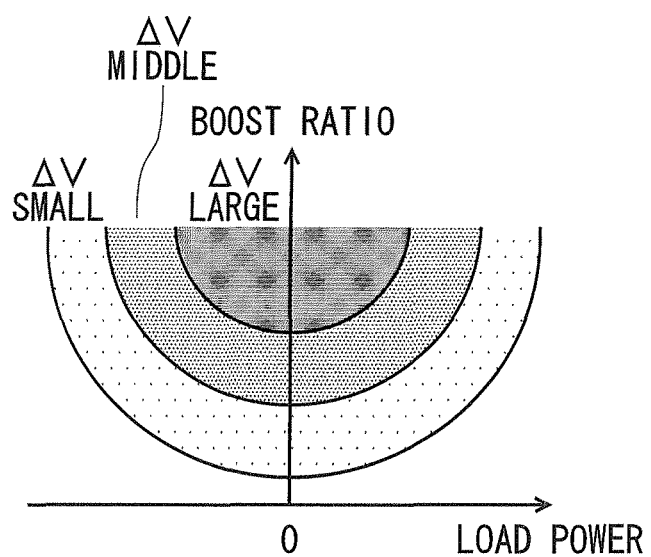
FIG. 4 is a graph showing a ΔV map.

The command voltage V2c, the detected value of the output voltage V1 of the DC power supply 101 and the load power P are inputted to the voltage fluctuation allowable amount deriving unit 205. The voltage fluctuation allowable amount deriving unit 205 calculates the ratio of the command voltage V2c to the output voltage V1, that is, the boost ratio of the converter 105. The voltage fluctuation allowable amount deriving unit 205 further derives a voltage fluctuation allowable amount ΔV corresponding to the load power P and the calculated boost ratio by using a map (hereinafter referred to as "ΔV map") indicating the voltage fluctuation allowable amount ΔV in accordance with the load power P and the calculated boost ratio. FIG. 4 is a graph showing the ΔV map.

Incidentally, as shown in FIG. 2(a), the voltage fluctuation allowable amount ΔV is a fluctuation allowable amount of the output voltage V2 of the converter 105 increasing or decreasing during the stop period when the converter controller 100C controls the converter 105 intermittently. The ΔV map indicates a voltage fluctuation allowable amount ΔV which can minimize the loss amount and which is obtained based on power outputted by the converter 105, the boost ratio and a change amount of the loss amount in the converter 105 between the stop period and the recovery period at the time of intermittent control.

Figure 5:
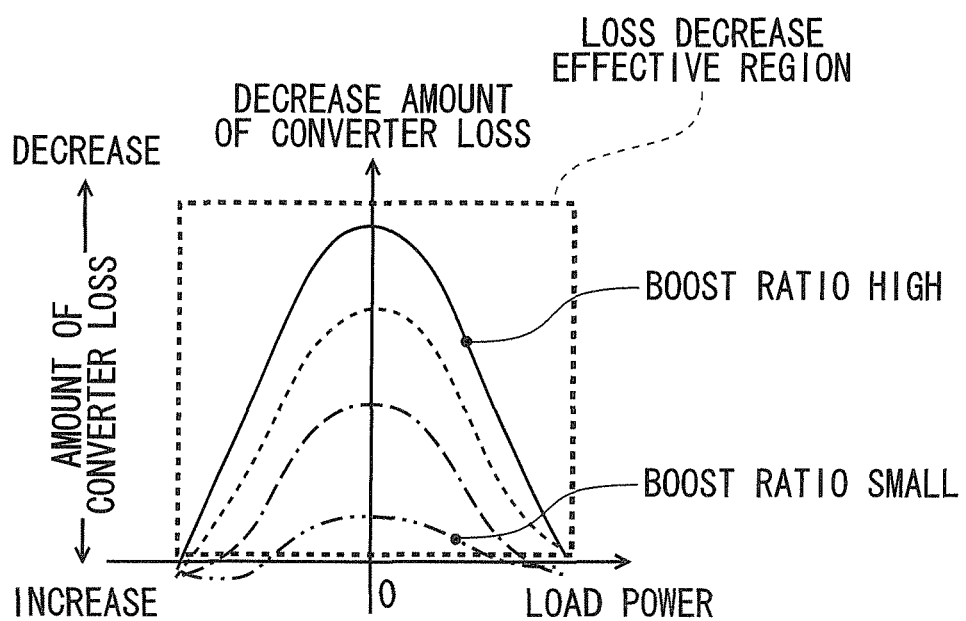
FIG. 5 is a graph showing a converter loss decrease amount map.

The command voltage V2c, the detected value of the output voltage V1 of the DC power supply 101 and the load power P are inputted to the converter loss decrease amount deriving unit 207. The converter loss decrease amount deriving unit 207 calculates the ratio of the command voltage V2c to the output voltage V1, that is, the boost ratio of the converter 105. The converter loss decrease amount deriving unit 207 further derives a decrease amount of converter loss corresponding to the load power P and the calculated boost ratio by using a map (hereinafter referred to as "converter loss decrease amount map") indicating the decrease amount of loss generated in the converter 105 in accordance with the load power P and the boost ratio at the time of intermittent control (converter loss decrease amount). FIG. 5 is a graph showing the converter loss decrease amount map. Incidentally, the decrease amount of converter loss is a decrease amount of loss which is generated in the converter 105 at the time of intermittent control and which is compared with the amount of loss generated in the converter 105 at the time of ordinary control. The ΔV map shown in FIG. 4 and the converter loss decrease amount map shown in FIG. 5 have relation to each other.

The voltage fluctuation allowable amount ΔV derived by the voltage fluctuation allowable amount deriving unit 205, the command voltage V2c, the torque command value T and the rotation angular velocity ω of the rotor of the electric motor 103 are inputted to the load loss increase amount deriving unit 209. The load loss increase amount deriving unit 209 derives a loss increase amount in the load (load loss increase amount) when the output voltage V2 of the converter 105 pulsates with a width of ΔV at the time of intermittent control.

Figure 6:
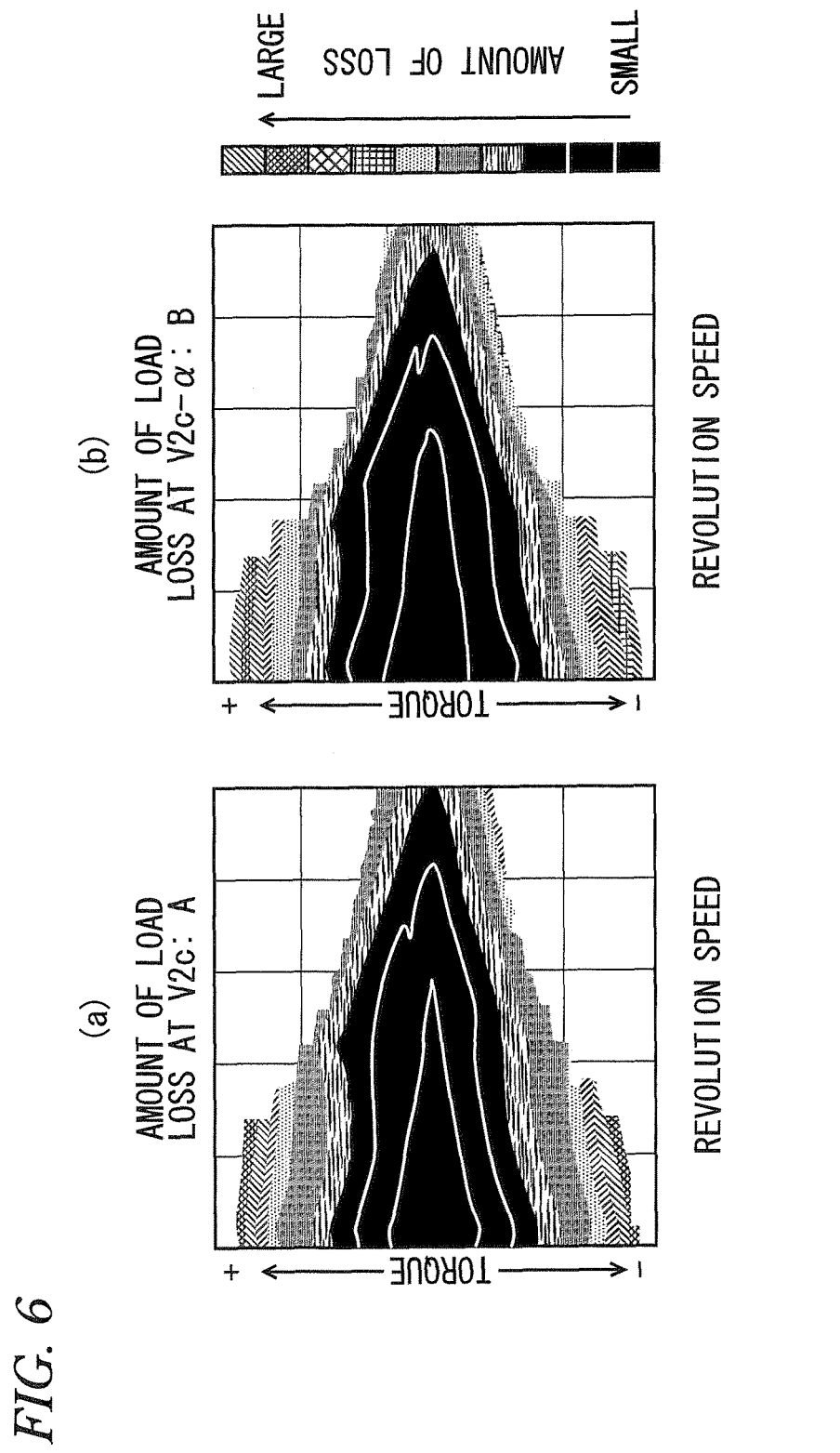
FIG. 6(a) is a graph showing a map indicating the magnitude of loss generated in the load (the amount of load loss) when the converter 105 outputs a command voltage V2c.
FIG. 6(b) is a graph showing a map indicating the magnitude of loss generated in the load (the amount of load loss) when the converter 105 outputs a "command voltage V2c-α"

When the load loss increase amount deriving unit 209 derives the load loss increase amount, a map shown in FIG. 6(a) or a map shown in FIG. 6(b) is used. FIG. 6(a) is a map indicating the magnitude of loss generated in the load (load loss amount) in accordance with the revolution speed and torque of the electric motor 103 when the converter 105 outputs the command voltage V2c. FIG. 6(b) is a map indicating the magnitude of loss generated in the load (load loss amount) in accordance with the revolution speed and torque of the electric motor 103 when the converter 105 outputs a "command voltage V2c-α".

Figure 7:
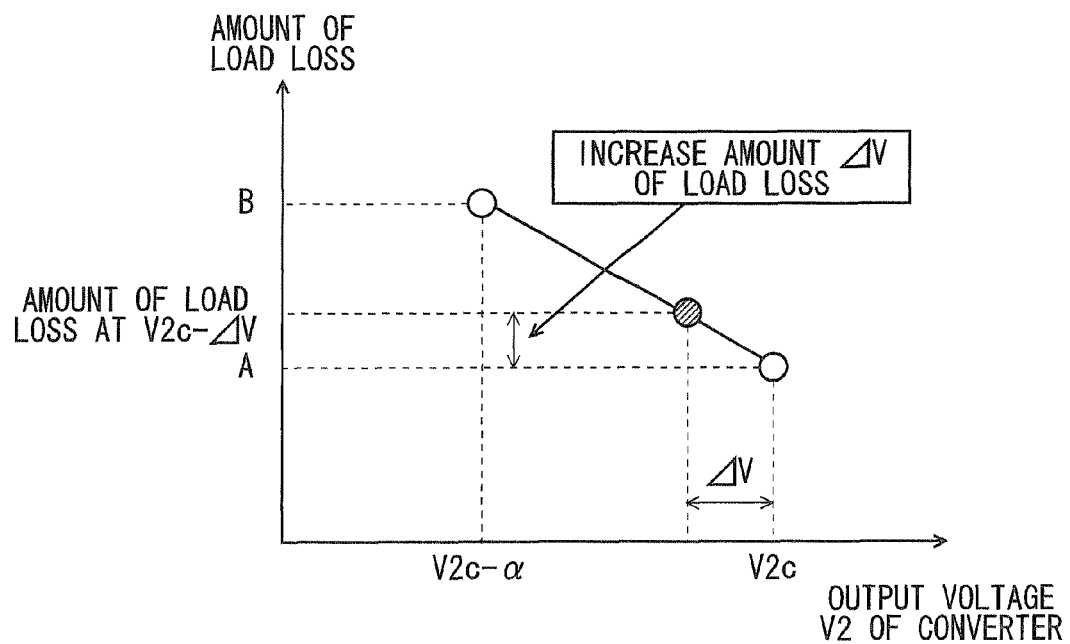
FIG. 7 is a graph showing the relation of an amount A of load loss obtained from FIG. 6(a) and an amount B of load loss obtained from FIG. 6(b) with the command voltage V2c and "command voltage V2c-α" and the increase amount of load loss generated in the load when the converter 105 outputs "V2c-ΔV"

The load loss increase amount deriving unit 209 derives amounts A and B of load loss from the respective maps shown in FIGS. 6(a) and 6(b) based on the torque command value T and the rotation angular velocity ω. FIG. 7 is a graph showing the relation of the amount A of load loss obtained from FIG. 6(a) and the amount B of load loss obtained from FIG. 6(b) with the command voltage V2c and the "command voltage V2c-α", and the increase amount of load loss generated in the load when the converter 105 outputs "V2c-ΔV". Accordingly, the increase amount of load loss generated in the load when the converter 105 outputs "V2c-ΔV" with respect to the amount A of load loss generated in the load when the converter 105 outputs the command voltage V2c can be calculated by the following expression.

Increase Amount of Load Loss=$\{(A-B)\times\Delta V\}/\alpha$

Incidentally, the waveform of the output voltage V2 of the converter 105 pulsating with a width of ΔV is shaped like triangular wave. For this reason, the load loss increase amount deriving unit 209 calculates the increase amount of load loss in accordance with the following expression.

Increase Amount of Load Loss=$\{(A-B)\times\Delta V/2\}/\alpha$

The control stop determining unit 211 compares the decrease amount of converter loss derived by the converter loss decrease amount deriving unit 207 with the increase amount of load loss derived by the load loss increase amount deriving unit 209. The control stop determining unit 211 outputs an operation command signal "1" when the decrease amount of converter loss is not larger than the increase amount of load loss, and outputs a stop command signal "0" when the decrease amount of converter loss is larger than the increase amount of load loss. This signal is inputted to the OR circuit 221.

The load power P calculated by the load power calculator 203 is inputted to the powering/regeneration determining unit 213. The powering/regeneration determining unit 213 determines, based on the sign of the load power P, whether the electric motor 103 is under a powering operation or under a regenerating operation. That is, the powering/regeneration determining unit 213 determines that the electric motor 103 is under a powering operation when the load power P takes a positive value, and determines that the electric motor 103 is under a regenerating operation when the load power P takes a negative value. The powering/regeneration determining unit 213 sends a selection signal indicating a result of the determination to the switch 219.

A value indicating the deviation ΔV2 (=V2c-V2) between the command voltage V2c and the output voltage V2 and the voltage fluctuation allowable amount ΔV derived by the voltage fluctuation allowable amount deriving unit 205 are inputted to the powering operation/stop determining unit 215. The powering operation/stop determining unit 215 determines, from hysteresis shown in the block of the powering operation/stop determining unit 215 in FIG. 2 based on the deviation ΔV2 and the voltage fluctuation allowable amount ΔV, whether PWM control of the converter 105 is to be performed (operated) or to be not performed (stopped). The powering operation/stop determining unit 215 outputs an operation command signal "1" when determination is made that PWM control is to be operated, and outputs a stop command signal "0" when determination is made that PWM control is to be stopped.

A value indicating the deviation $\Delta V2$ ($=V2c-V2$) between the command voltage V2$c$ and the output voltage V2 and the voltage fluctuation allowable amount $\Delta V$ derived by the voltage fluctuation allowable amount deriving unit 205 are inputted to the regenerating operation/stop determining unit 217. The regenerating operation/stop determining unit 217 determines, from hysteresis shown in the block of the regenerating operation/stop determining unit 217 in FIG. 2 based on the deviation $\Delta V2$ and the voltage fluctuation allowable amount $\Delta V$, whether PWM control of the converter 105 is to be performed (operated) or to be not performed (stopped). The regenerating operation/stop determining unit 217 outputs an operation command signal "1" when determination is made that PWM control is to be operated, and outputs a stop command signal "0" when determination is made that PWM control is to be stopped.

Figure 8:
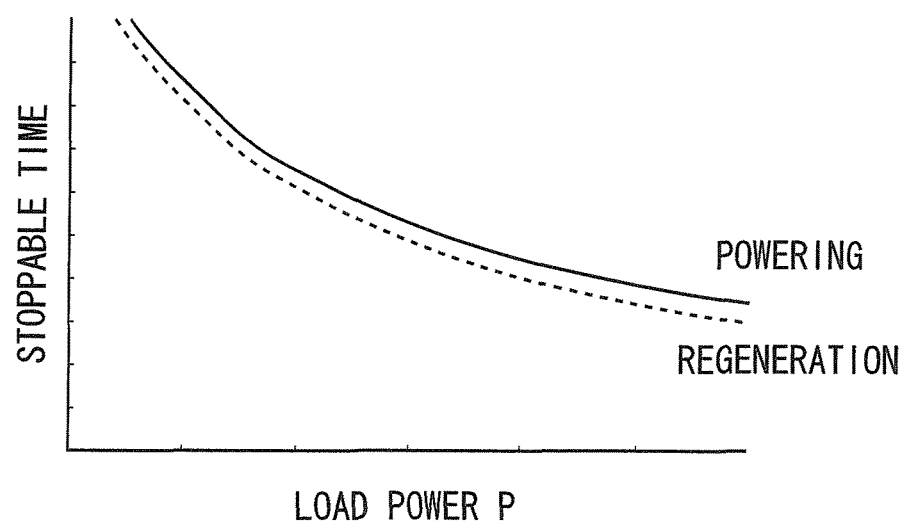
FIG. 8 is a graph showing the relation between load power P and stoppable time in accordance with a predetermined voltage fluctuation allowable amount ΔV when an electric motor 103 is under powering operation and under regenerating operation.

Another method than the aforementioned method using the result of comparison between the deviation $\Delta V2$ and the voltage fluctuation allowable amount $\Delta V$ may be used when the powering operation/stop determining unit 215 and the regenerating operation/stop determining unit 217 determine whether PWM control of the converter 105 is to be performed (operated) or to be not performed (stopped). For example, the converter controller 100C may acquire the time required for arrival of the deviation $\Delta V2$ at the voltage fluctuation allowable amount $\Delta V$ (stoppable time) from a graph shown in FIG. 8. FIG. 8 is a graph showing the relation between load power P and stoppable time in accordance with a predetermined voltage fluctuation allowable amount $\Delta V$ when the electric motor 103 makes either of powering operation and regenerating operation. In this case, the converter controller 100C has a stoppable time deriving unit (not shown) which derives stoppable time corresponding to the load power P derived by the load power calculator 203. The powering operation/stop determining unit 215 and the regenerating operation/stop determining unit 217 output an operation command signal "1" to restart PWM control of the converter 105 when the stoppable time has passed after PWM control of the converter 105 was stopped.

The switch 219 outputs either of a signal from the powering operation/stop determining unit 215 and a signal from the regenerating operation/stop determining unit 217 in accordance with the selection signal outputted from the powering/regeneration determining unit 213. The signal outputted from the switch 219 is inputted to the OR circuit 221.

The OR circuit 221 performs OR operation on the signal (1 or 0) inputted from the switch 219 and the signal (1 or 0) inputted from the control stop determining unit 211 and outputs a signal (1 or 0) indicating a result of the operation. Accordingly, the OR circuit 221 outputs a signal "0" only when the signal from the powering operation/stop determining unit 215 or the regenerating operation/stop determining unit 217 selected by the switch 219 is a stop command signal "0" and the control stop determining unit 211 outputs a stop command signal "0". The signal outputted from the OR circuit 221 is inputted to the PWM controller 223.

The duty (Duty) derived by the duty deriving unit 201, the signal outputted from the OR circuit 221 and the duty of 0% are inputted to the PWM controller 223. The PWM controller 223 performs PWM control of the converter 105 in accordance with the signal inputted from the OR circuit 221. The PWM controller 223 performs PWM control of the converter 105 based on the duty (Duty) from the duty deriving unit 201 when the signal outputted from the OR circuit 221 is "1", and does not perform PWM control of the converter 105 when the signal outputted from the OR circuit 221 is "0".

Figure 9:
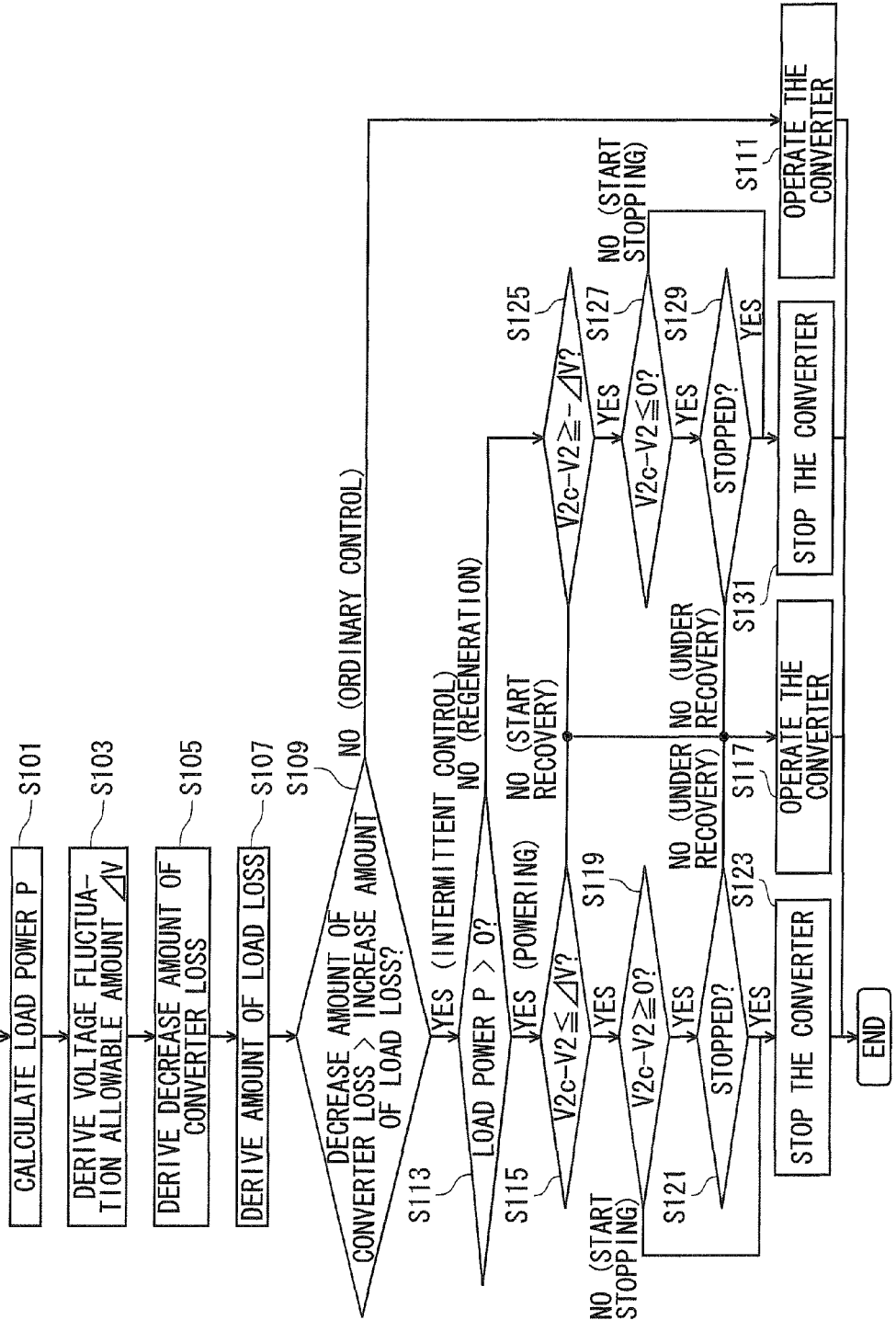
FIG. 9 is a flow chart showing operation of the converter controller 100C.

FIG. 9 is a flow chart showing operation of the converter controller 100C. As shown in FIG. 9, the load power calculator 203 calculates load power P (step S101). The voltage fluctuation allowable amount deriving unit 205 derives a voltage fluctuation allowable amount $\Delta V$ in accordance with the load power P and the boost ratio by using the $\Delta V$ map shown in FIG. 4 (step S103). The converter loss decrease amount deriving unit 207 derives a decrease amount of converter loss in accordance with the load power P and the boost ratio by using the converter loss decrease amount map shown in FIG. 5 (step S105). The load loss increase amount deriving unit 209 calculates an increase amount of load loss by using the map shown in FIG. 6($a$) or 6($b$) and the aforementioned calculation expression (step S107).

The control stop determining unit 211 compares the decrease amount of converter loss with the increase amount of load loss (step S109). The flow of processing goes to step S111 when the decrease amount of converter loss is not larger than the increase amount of load loss, and goes to step S113 when the decrease amount of converter loss is larger than the increase amount of load loss. In the step S111, the converter controller 100C performs PWM control of the converter 105. Incidentally, PWM control performed in the step S111 corresponds to ordinary control shown in FIG. 2. On the other hand, in the step S113, the powering/regeneration determining unit 213 determines, based on the sign of the load power P, whether the electric motor 103 is under a powering operation or under a regenerating operation. When the load power P is larger than 0, the powering/regeneration determining unit 213 determines that the electric motor 103 is under a powering operation, so that the flow of processing goes to step S115. When the load power P is not larger than 0, the powering/regeneration determining unit 213 determines that the electric motor 103 is under a regenerating operation, so that the flow of processing goes to step S125.

In the step S115, the powering operation/stop determining unit 215 compares a value indicating the deviation $\Delta V2$ ($=V2c-V2$) between the command voltage V2$c$ and the output voltage V2 with the voltage fluctuation allowable amount $\Delta V$. When the deviation $\Delta V2$ is larger than the voltage fluctuation allowable amount $\Delta V$, the flow of processing goes to step S117. When the deviation $\Delta V2$ is not larger than the voltage fluctuation allowable amount $\Delta V$, the flow of processing goes to step S119. In the step S117, the converter controller 100C performs PWM control of the converter 105. Incidentally, the period of PWM control in the step S117 corresponds to the recovery period in intermittent control shown in FIG. 2.

On the other hand, in the step S119, the powering operation/stop determining unit 215 determines whether the deviation $\Delta V2$ ($=V2c-V2$) is at least 0 or not. In the case of $\Delta V2 \geq 0$, the flow of processing goes to step S121. In the case of $\Delta V2<0$, the flow of processing goes to step S123. In the step S121, determination is made as to whether PWM control of the converter 105 by the converter controller 100C is stopped or not. When it is stopped, the flow of processing goes to the step S123. When it is not stopped, the flow of processing goes to the step S117. In the step S123, the converter controller 100C does not perform PWM control of the converter 105. Incidentally, the period when PWM control is not performed in the step S123 corresponds to the stop period in intermittent control at the time of powering operation of the electric motor 103 shown in FIG. 2.

When the flow of processing goes to the step S125 because the powering/regeneration determining unit 213 determines that the electric motor 103 is under regenerating operation, the regenerating operation/stop determining unit 217 compares the value indicating the deviation $\Delta V2$ (=V2c−V2) between the command voltage V2c and the output voltage V2 with the voltage fluctuation allowable amount $\Delta V$. When the deviation $\Delta V2$ is not smaller than −$\Delta V$, the flow of processing goes to the step S117. When the deviation $\Delta V2$ is smaller than −$\Delta V$, the flow of processing goes to step S127.

In the step S127, the regenerating operation/stop determining unit 217 determines whether the deviation $\Delta V2$ (=V2c−V2) is at most 0 or not. In the case of $\Delta V2 \leq 0$, the flow of processing goes to step S129. In the case of $\Delta V2 > 0$, the flow of processing goes to step S131. In the step S129, determination is made as to whether PWM control of the converter 105 by the converter controller 100C is stopped or not. When it is stopped, the flow of processing goes to the step S131. When it is not stopped, the flow of processing goes to the step S117. In the step S131, the converter controller 100C does not perform PWM control of the converter 105. Incidentally, the period when PWM control is not performed in the step S131 corresponds to the stop period in intermittent control at the time of regenerating operation of the electric motor 103 shown in FIG. 2.

As described above, in accordance with the load driving system according to this embodiment, the converter controller 100C performs intermittent control of the converter 105 when the decrease amount of loss in the converter 105 in the case where the converter 105 is controlled intermittently (converter loss decrease amount) is larger than the increase amount of loss in the load in the case where the converter 105 is controlled intermittently so that the output voltage V2 of the converter 105 pulsates with a fluctuation width of a voltage fluctuation allowable amount $\Delta V$ (load loss increase amount). Accordingly, the converter 105 can be controlled intermittently only when total loss in the load driving system including the converter 105 and the load decreases.

At the time of intermittent control of the converter 105, the converter controller 100C controls the stop period so that the fluctuation width of the output voltage V2 of the converter 105 is equal to the voltage fluctuation allowable amount $\Delta V$. As described above, the $\Delta V$ map used for deriving the voltage fluctuation allowable amount $\Delta V$ has relation with the converter loss decrease amount map. Accordingly, the voltage fluctuation allowable amount deriving unit derives the voltage fluctuation allowable amount $\Delta V$ so that the decrease amount of converter loss is maximized at the time of intermittent control of the converter 105. In this manner, the decrease amount of converter loss at the time of intermittent control of the converter 105 can be set to be maximized, so that the opportunity to control the converter 105 intermittently can be increased.

Figure 10:
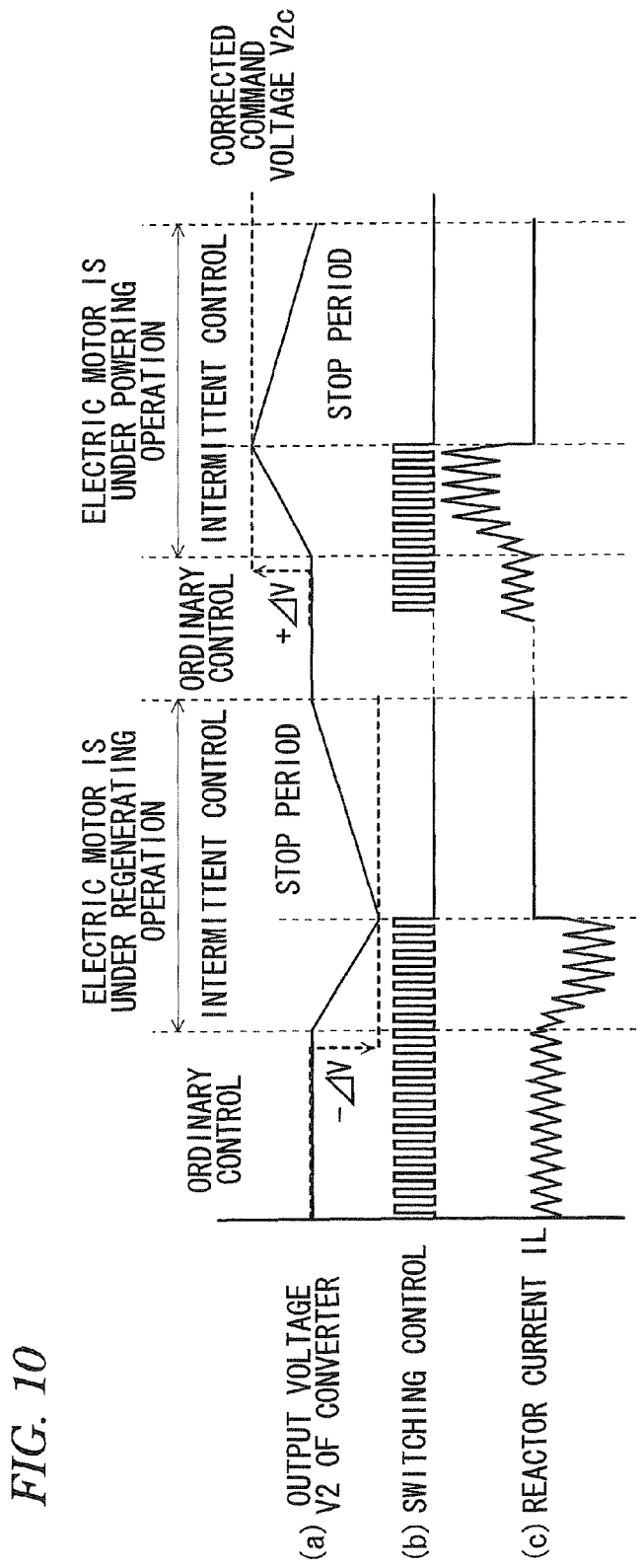
FIG. 10 is a graph showing (a) the output voltage V2 of the converter 105, (b) switching control of transistors forming the converter 105 and (c) the reactor current IL flowing into the reactor L forming the converter 105 when the command voltage V2c is increased/decreased at the time of intermittent control of the converter 105.

Although FIG. 2 used for description of the embodiment shows the case where the command voltage V2c is constant, the command voltage V2c may be increased/decreased in accordance with the state of the electric motor 103. FIG. 10 is a graph showing (a) the output voltage V2 of the converter 105, (b) switching control of transistors forming the converter 105 and (c) a reactor current IL flowing into a reactor L forming the converter 105 when the command voltage V2c is increased/decreased at the time of intermittent control of the converter 105. As shown in FIG. 10, when the electric motor 103 is under powering operation, the converter controller 100C may correct the command voltage V2c so that the command voltage V2c becomes higher within the range of the voltage fluctuation allowable amount $\Delta V$ than that at the time of ordinary control. In this case, the powering operation/stop determining unit 215 executes PWM control of the converter 105 until the output voltage V2 of the converter 105 reaches the corrected command voltage V2c in intermittent control, and stops the PWM control after the output voltage V2 of the converter 105 reaches the corrected command voltage V2c.

Figure 16:
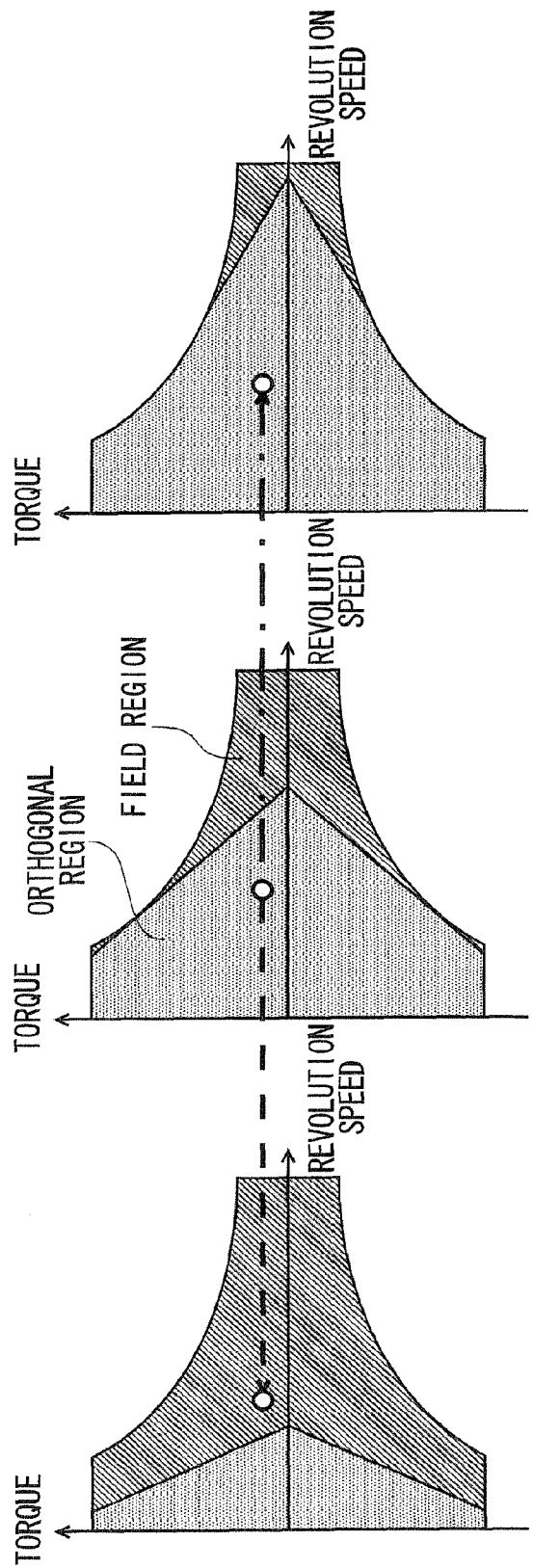
FIG. 16(a) to (c) are graphs showing the relation between revolution speed and torque in the electric motor and the orthogonal region and field-weakening region of the electric motor in accordance with the magnitude of the input voltage.
Figure 17:
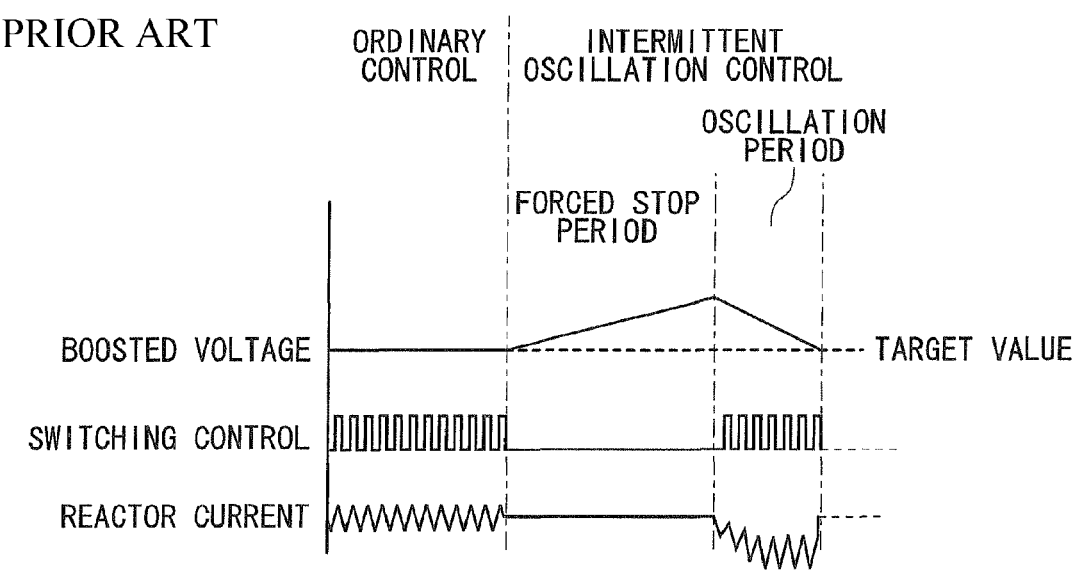
FIG. 17 is a graph showing a result of intermittent oscillation control of the DC/DC converter based on Patent Document 2.
Figure 18:
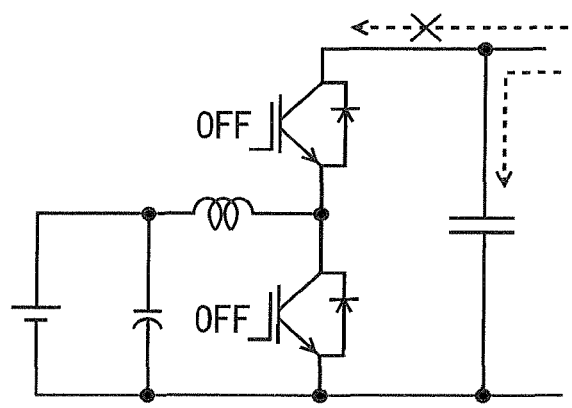
FIG. 18 is a circuit diagram showing a flow of current in a state where the output voltage of the DC/DC converter boosts during the forced stop period.

When the command voltage V2c is corrected in this manner, the output voltage V2 of the converter 105 becomes higher than that at the time of ordinary control even if the output voltage V2 dropped in the stop period in intermittent control as shown in FIG. 10. As shown in FIGS. 16(a) to 16(c), loss in the load may be suppressed as the output voltage V2 of the converter 105, that is, the input voltage of the electric motor 103 becomes high. However, in accordance with the voltage fluctuation allowable amount $\Delta V$, loss may be low as the output voltage V2 becomes low.

On the other hand, when the electric motor 103 is under regenerating operation, the converter controller 100C may correct the command voltage V2c so that the command voltage V2c becomes lower within the range of the voltage fluctuation allowable amount $\Delta V$ than that at the time of ordinary control. In this case, the regenerating operation/stop determining unit 217 executes PWM control of the converter 105 until the output voltage V2 of the converter 105 reaches the corrected command voltage V2c in intermittent control, and stops the PWM control after the output voltage V2 of the converter 105 reaches the corrected command voltage V2c.

When the command voltage V2c is corrected in this manner, the output voltage V2 of the converter 105 becomes lower in value than that at the time of ordinary control even if the output voltage V2 increased in the stop period in intermittent control as shown in FIG. 10. Accordingly, the capacitor C provided in the load driving system shown in FIG. 1 can be prevented from being broken down by a high regenerating voltage.

Although intermittent control in the embodiment shown in FIG. 2 is set so that the recovery period (switching control) is provided after the stop period of switching control, the same effect can be obtained in the case where the stop period is provided after execution of switching control. Also in the embodiment shown in FIG. 10, the recovery period (switching control) may be executed after the stop period in the same manner.

Figure 11:
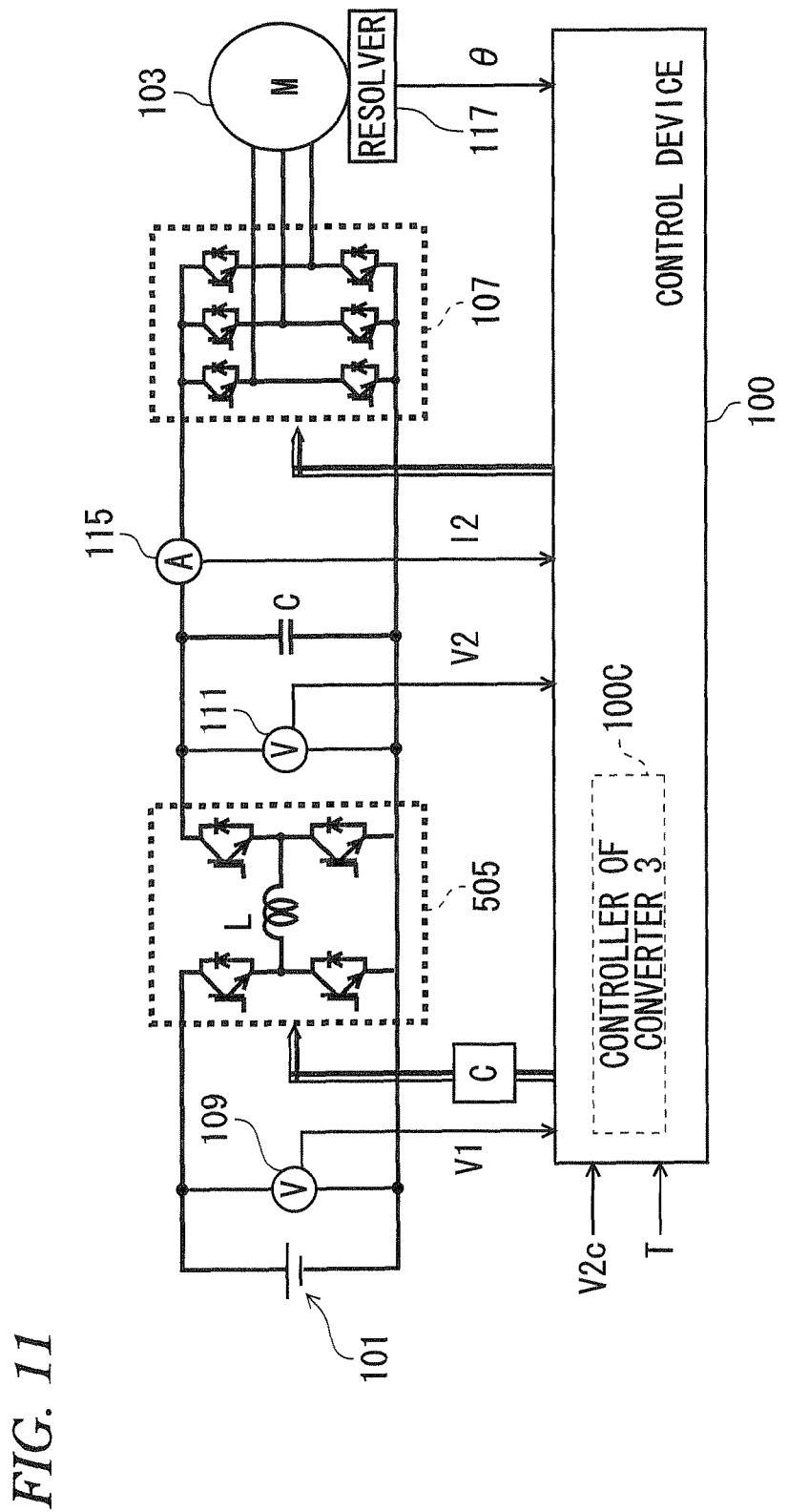
FIG. 11 is a diagram showing the configuration of a load driving system including a boost-buck converter.
Figure 12:
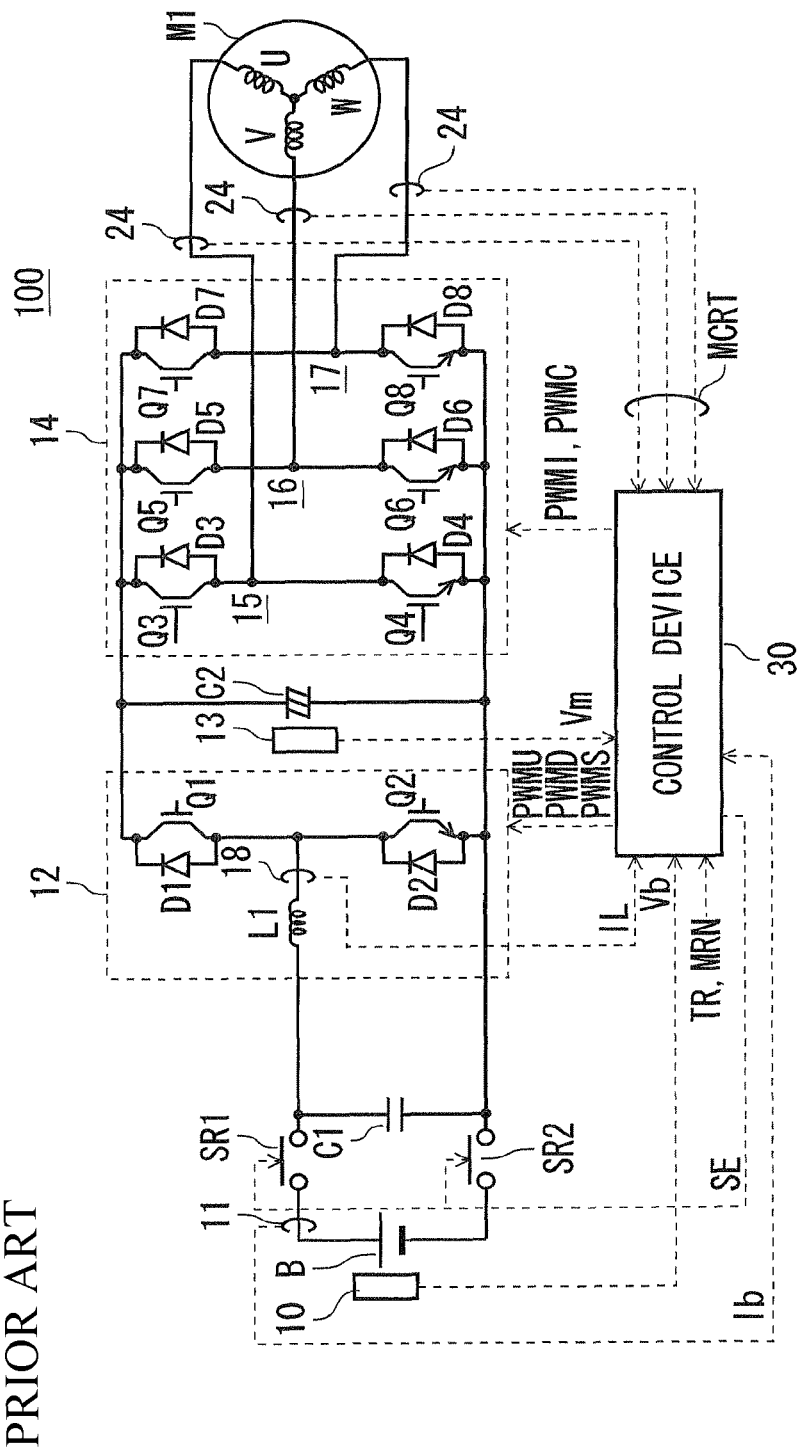
FIG. 12 is a schematic block diagram of a motor driving device disclosed in Patent Document 1.
Figure 13:
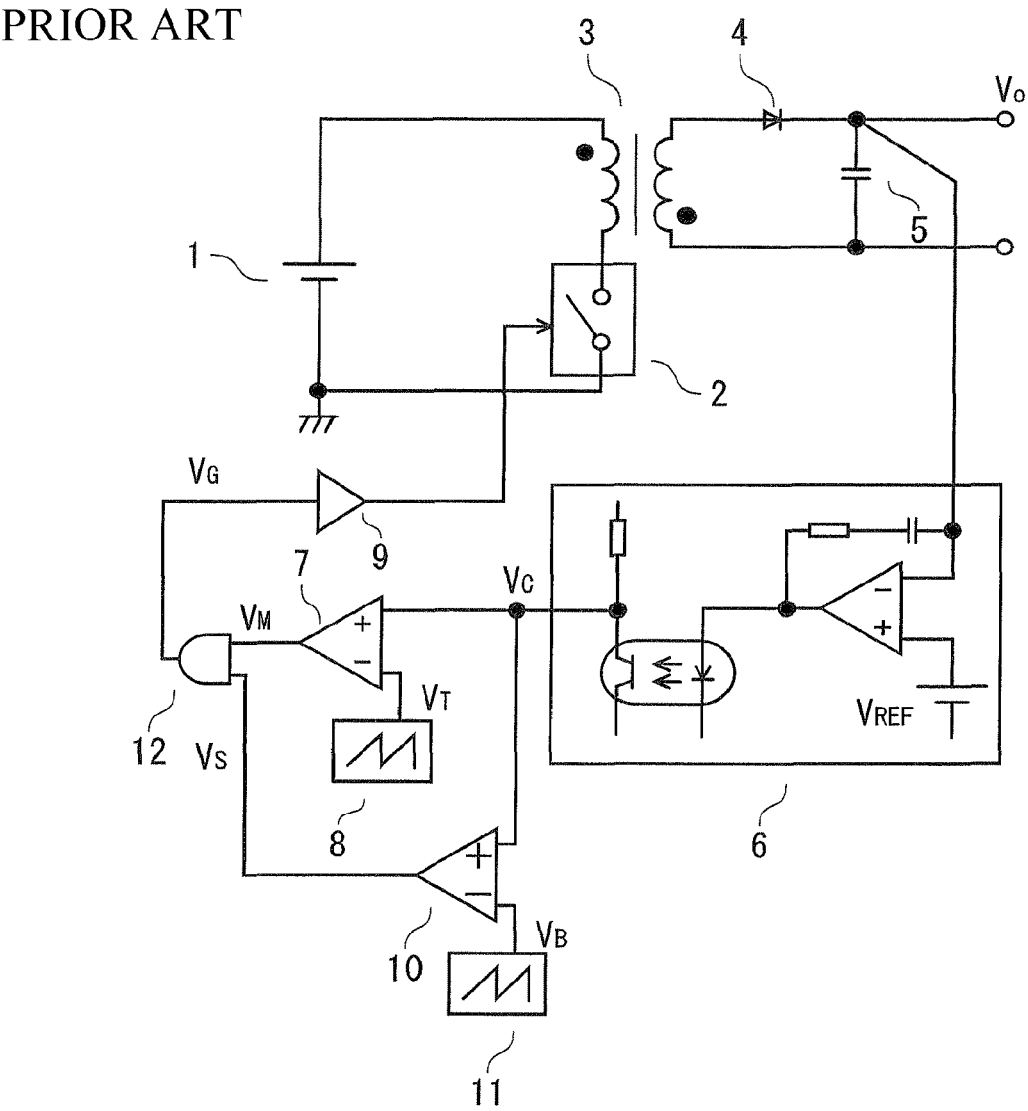
FIG. 13 is a circuit diagram showing a control system of a DC/DC converter disclosed in Patent Document 2.
Figure 14:
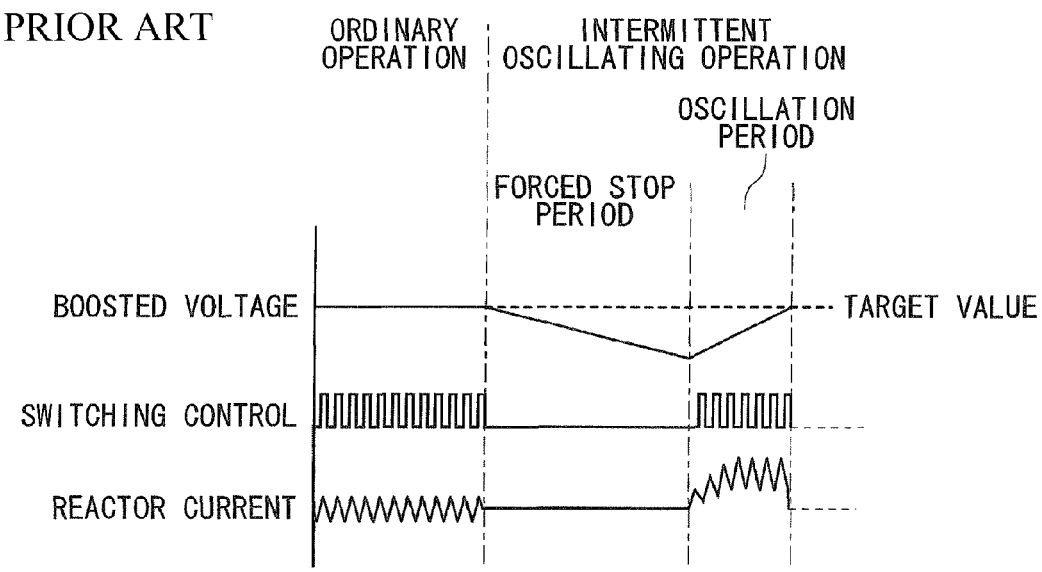
FIG. 14 is a graph showing a result of intermittent oscillation control of the DC/DC converter based on Patent Document 2.
Figure 15:
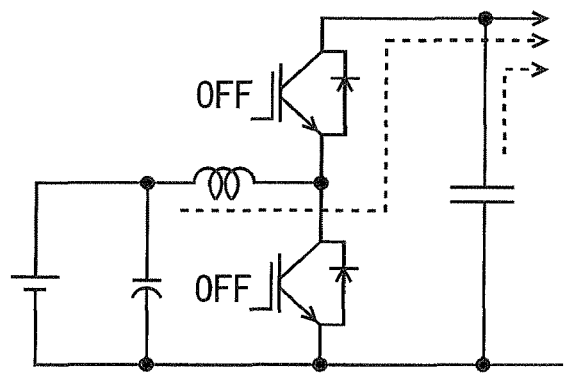
FIG. 15 is a circuit diagram showing a flow of current in a state where the output voltage of the DC/DC converter drops during the forced stop period.

Although the aforementioned embodiment has been described in the case where the boost converter 105 is taken as an example, a boost-buck converter 505 shown in FIG. 11 or a buck converter may be used instead. Although the voltage fluctuation allowable amount deriving unit 205 derives the voltage fluctuation allowable amount $\Delta V$ by using the $\Delta V$ map in the aforementioned embodiment, the voltage fluctuation allowable amount $\Delta V$ may be set as a fixed value.

Although the invention has been described in detail and with reference to specific embodiments, it is obvious to those skilled in the art that various changes or modifications can be made without departing from the spirit and scope of the invention.

This application is based on Japanese Patent Application (Patent Application 2009-139240) filed on Jun. 10, 2009 and the contents of which are incorporated here by reference.

DESCRIPTION OF REFERENCE NUMERALS AND SIGNS 100 control device
100C converter controller
101 DC power supply
103 electric motor 105 boost converter
107 inverter
109, 111 voltage sensor
115 current sensor
117 resolver
201 duty deriving unit
203 load power calculator
205 voltage fluctuation allowable amount deriving unit
207 converter loss decrease amount deriving unit
209 load loss increase amount deriving unit
211 control stop determining unit
213 powering/regeneration determining unit
215 powering operation/stop determining unit
217 regenerating operation/stop determining unit
219 switch
221 OR circuit
223 PWM controller

What is claimed is:

1. A control device of a transformer that boosts or drops an output voltage of a DC power supply and provides the output voltage to a load, the control device comprising:
a switching controller which performs switching control of the transformer;
a load power deriving unit which derives load power;
a transformer loss decrease amount deriving unit which derives a decrease amount of loss generated in the transformer assuming the switching controller performs intermittent control of the transformer, based on the load power derived by the load power deriving unit and a transformer ratio of the transformer, wherein the amount of loss generated in the transformer is decreased when changing from ordinary control of the transformer to intermittent control of the transformer;
a load loss increase amount deriving unit which derives an increase amount of loss generated in the load assuming the switching controller performs the intermittent control of the transformer, wherein the amount of loss generated in the load is increased when changing from ordinary control of the transformer to intermittent control of the transformer; and
a control command unit which instructs the switching controller to perform the intermittent control of the transformer under at least one condition that the decrease amount of transformer loss derived by the transformer loss decrease amount deriving unit is larger than the increase amount of load loss derived by the load loss increase amount deriving unit.

2. The control device of claim 1, further comprising:
a voltage fluctuation allowable amount deriving unit which derives an amount of voltage by which an allowable amount of voltage of the transformer may fluctuate, based on the load power derived by the load power deriving unit and the transformer ratio of the transformer, when the switching controller performs the intermittent control of the transformer,
wherein the load loss increase amount deriving unit derives an increase amount of loss generated in the load, when the output voltage of the transformer pulsates with a amplitude of the voltage fluctuation allowable amount and the switching controller performs the intermittent control of the transformer.

3. The control device of claim 2, further comprising:
a voltage detector which detects the output voltage of the transformer, and
wherein the switching controller restarts switching control of the transformer, when a change amount of the output voltage of the transformer detected by the voltage detector reaches the voltage fluctuation allowable amount while switching control of the transformer is stopped at the time of the intermittent control of the transformer.

4. The control device of claim 3, wherein the switching controller stops the switching control of the transformer, when the output voltage reaches a command voltage for the transformer when switching control of the transformer is operated at the time of the intermittent control of the transformer.

5. The control device of claim 2, further comprising:
a stoppable time deriving unit which derives a stoppable time when switching control of the transformer can be stopped by the switching controller, in accordance with the load power derived by the load power deriving unit,
wherein the switching controller restarts switching control of the transformer, when the stoppable time has passed after the switching control of the transformer was stopped at the time of the intermittent control of the transformer.

6. The control device of claim 2,
wherein the control device increases a command voltage for the transformer in a range of the voltage fluctuation allowable amount, when the switching controller performs the intermittent control of the transformer in a state where the load outputs electric power.

7. The control device of claim 2,
wherein the control device decreases a command voltage for the transformer in a range of the voltage fluctuation allowable amount, when the switching controller performs the intermittent control of the transformer in a state where the load consumes electric power.

8. The control device of claim 7, wherein the switching controller starts switching control of the transformer when a deviation between the output voltage and a corrected command voltage is not smaller than a deviation between an uncorrected command voltage and the corrected command voltage at the time of intermittent control of the transformer.

9. The control device of claim 8, wherein the switching controller stops switching control of the transformer when the output voltage reaches the corrected command voltage while switching control of the transformer is operated at the time of intermittent control of the transformer.

* * * * *